(No Model.)

W. H. KEATING.
OVEN GRATE.

No. 301,372. Patented July 1, 1884.

Witnesses:
H. E. Rimick
L. J. White

Inventor
William H. Keating,
Per C. A. Shaw
Atty.

UNITED STATES PATENT OFFICE.

WILLIAM H. KEATING, OF BOSTON, MASSACHUSETTS.

OVEN-GRATE.

SPECIFICATION forming part of Letters Patent No. 301,372, dated July 1, 1884.

Application filed September 14, 1883. (No model.)

*To all whom it may concern:*

Be it known that I, WILLIAM H. KEATING, of Boston, in the county of Suffolk, State of Massachusetts, have invented a certain new and useful Improvement in Oven-Grates, of which the following is a description sufficiently full, clear, and exact to enable any person skilled in the art or science to which said invention appertains to make and use the same, reference being had to the accompanying drawings, forming a part of this specification, in which—

Figure 1:
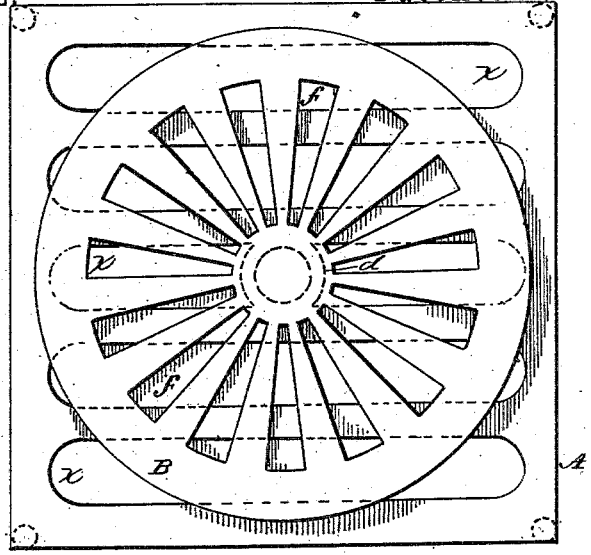
Figure 2:

Figure 1 is an isometrical perspective view, and Fig. 2 a vertical longitudinal section.

Like letters and figures of reference indicate corresponding parts in the different figures of the drawings.

In baking pies, puddings, &c., in the ovens of ordinary cooking-stoves they are liable to burn or to be baked unevenly on account of the heat being greater next the fire, or on one side of the oven than it is on the other.

This invention relates to rotary oven-grates designed to obviate this difficulty.

The objects of the invention are to provide a grate of this character which may be readily applied to and removed from any ordinary oven, and which is simple and cheap.

To these ends the invention consists in an oven-grate of peculiar construction, as hereinafter described and claimed.

In the drawings, A represents the body or base of the grate, and B the table. The base is square, and consists of a thin flat piece of iron having a series of elongated slots, $x$, and provided with the legs $m$, and an upwardly-projecting centrally-arranged boss, $d$, the legs and hub being cast integral with the base. The table is round and provided with a series of radial slots, $f$, and a recessed hub, $d'$, which is centrally pivoted to the boss $d$, so as to revolve freely thereon. The table is elevated slightly above the base, so as to permit the free circulation of air between these parts, as shown at $v$.

In the use of my improvement the grate is placed in the stove on the bottom of the oven, or on the ordinary sliding grate, and the pie or pudding to be baked is placed on the table B, the table being turned from time to time during the process to change the position of the pie, so as to expose all of its sides in regular succession to the hottest part of the oven, and thereby bake it evenly.

In nearly all cooking-stoves having ovens the fire-pot is arranged at one side of the oven, thereby heating the air unequally—that is to say, the air in that part of the oven next the fire-pot will be heated or rarefied to a greater extent than that at the opposite side, thereby generating a current of air within the oven. To direct and utilize this heated current to the best advantage is one object of my invention; and to that end I construct the base A with a series of elongated slots, $x$, arranged in parallelism, and mount it on the legs $m$, so that as the air flows across the bottom of the oven and rises through the slots $x$ it will be distributed uniformly to the plate or dish on the table B, which is provided with radial slots which serve further to distribute the current.

I do not confine myself to using the grate for pies and puddings alone, as it is valuable for baking bread, cake, &c., and may also be used to advantage in an ordinary brick oven, or in any oven used for culinary purposes.

I am aware that portable oven-grates having rotary tables are not new, broadly; but in my invention the stationary and rotary plates being provided with slots arranged as described, the current of air is utilized to the best advantage.

Having thus explained my invention, what I claim is—

As a new article of manufacture, a portable or removable oven-grate consisting of a base-plate provided with legs, and having a series of parallel elongated slots, and a table provided with a series of radial slots, said table being centrally pivoted to rotate on said base, substantially as set forth.

WILLIAM H. KEATING.

Witnesses:
L. J. WHITE,
C. A. SHAW.